United States Patent
Lin et al.

(10) Patent No.: US 11,224,967 B1
(45) Date of Patent: Jan. 18, 2022

(54) CAMERA-CONTROLLED SELF-DELIVERY CART

(71) Applicant: Amazon Technologies, Inc., Seattle, WA (US)

(72) Inventors: Sheng-Wei Lin, Carindale (AU); Todd Beckett, Seattle, WA (US); Jon Robert Ducrou, Brisbane (AU); Alexander Edwards, Brisbane (AU); Ryan David Hapgood, Cannon Hill (AU); Michael John Neville, Bunya (AU); Jenna Christine Owens, Seattle, WA (US); Lev Zelenskiy, South Brisbane (AU)

(73) Assignee: Amazon Technologies, Inc., Seattle, WA (US)

( * ) Notice: Subject to any disclaimer, the term of this patent is extended or adjusted under 35 U.S.C. 154(b) by 467 days.

(21) Appl. No.: 16/283,273

(22) Filed: Feb. 22, 2019

(51) Int. Cl.
| | | |
|---|---|---|
| *A47F 10/04* | (2006.01) | |
| *B25J 5/00* | (2006.01) | |
| *B25J 9/16* | (2006.01) | |
| *G06T 7/90* | (2017.01) | |
| *H04W 4/029* | (2018.01) | |
| *H04W 4/40* | (2018.01) | |

(52) U.S. Cl.
CPC ............ *B25J 5/005* (2013.01); *B25J 9/1612* (2013.01); *B25J 9/1679* (2013.01); *B25J 9/1697* (2013.01); *G06T 7/90* (2017.01); *H04W 4/029* (2018.02); *H04W 4/40* (2018.02)

(58) Field of Classification Search
CPC ...... A47F 10/04; A47F 13/00; A47L 11/4011; A47L 2201/04; B07C 2501/0063; B07C 5/3422; B62B 5/0026; B62B 5/0069; B65F 2210/168; G01C 21/206; G06Q 30/0639; G06Q 30/0641; Y10S 901/01; B25J 5/005; B25J 9/1612; B25J 9/1679; B25J 5/1697; H04W 4/029; H04W 4/40; G06T 7/90
See application file for complete search history.

(56) References Cited

U.S. PATENT DOCUMENTS

| | | | |
|---|---|---|---|
| 10,071,891 B2 * | 9/2018 | High | G06Q 30/0613 |
| 10,081,525 B2 * | 9/2018 | High | B62B 5/0069 |
| 10,189,692 B2 * | 1/2019 | High | H04W 4/029 |
| 10,336,592 B2 * | 7/2019 | Atchley | B60L 53/36 |
| 10,486,951 B2 * | 11/2019 | High | G06Q 30/0613 |
| 10,875,752 B2 * | 12/2020 | High | G01S 1/7034 |

OTHER PUBLICATIONS

Wang et al., 3S-cart: A Lightweight, Interactive Sensor-Based Cart for Smart Shopping in Supermarkets, 2016, IEEE, p. 6774-6781 (Year: 2016).*

(Continued)

*Primary Examiner* — McDieunel Marc
(74) *Attorney, Agent, or Firm* — Kilpatrick Townsend & Stockton LLP (57) ABSTRACT

A user location in a parking lot or other designated area may be identified based on sensor data, such as from one or more sensors in or around the designated area. Also within the designated area, a transport location of a transport associated with an order of the user may be identified based on image data provided by one or more cameras remote from the transport. The transport can be controlled to move from the identified transport location to the identified user location.

12 Claims, 5 Drawing Sheets

(56) References Cited

OTHER PUBLICATIONS

Park et al., Cart Auditor: A Compliance and Training Tool for Cashiers at Checkout, 2010, IEEE, p. 151-155 (Year: 2010).*
Zimmerman et al., Tracking Shopping Carts Using Mobile Cameras Viewing Ceiling-Mounted Retro-Reflective BarCodes, 2006, IEEE, p. 1-8 (Year: 2006).*
Chiang et al., Development of smart shopping carts with customer-oriented service, 2016, IEEE, p. 1-2 (Year: 2016).*
U.S. Appl. No. 14/733,298, "Reducing Payload Fulfillment Time via Transport Unit Self-Identification," filed Jun. 8, 2015, 38 pages.
U.S. Appl. No. 16/057,430, "Sensor-Based Customer Arrival Detection," filed Aug. 7, 2018, 45 pages.

\* cited by examiner

CAMERA-CONTROLLED SELF-DELIVERY CART

BACKGROUND

Consumers want the ability to order items online or with a mobile device. If a customer wants to pick up their items instead of having the items shipped or otherwise delivered, the customer in some cases can choose to drive to a physical location and pick up the items. In order to facilitate a customer's item pickup, while minimizing the amount of time that the customer waits in his or her vehicle, merchants dedicate resources to determine when a customer has arrived at the physical location and which vehicle the items need to be delivered to. Generally, this entails having a dedicated merchant representative outside, watching and waiting for the customer to arrive and identifying where the customer parks his or her vehicle before delivering their items. However, this process costs both time and money and is prone to mistakes and long wait times due to human error.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include methods and apparatuses for using sensors to control a transport in a designated area, for example, to deliver items from a fulfillment center to an end-user who has arrived in the designated area. In some scenarios, one or more cameras and/or other sensors may be used to monitor the designated area (e.g., a parking lot) for the arrival of the end-user (e.g., a customer). Once the end-user has arrived at the designated area, the correct transport (e.g., a cart) may be identified and controlled to move to the end-user's location based on input, about the end user's position, from the cameras and/or other sensors. The transport may be any device, vehicle, or carrier capable of transporting one or more items. For example, in some embodiments, the transport may be a wheeled cart or a truck. In some embodiments, the transport may include a communication device and propulsion system that may be controlled in response to input from the cameras and/or other sensors to navigate the transport around the designated area. The designated area may be, for example, a parking lot. The one or more sensors may be or include components for facilitating, for example, cameras, active or passive radio localization, an automatic license plate reader (ALPR), or ultra-sonic localization.

By way of illustrative example, a system may use one or more cameras, dispersed throughout a designated parking area, to identify a customer entering the designated parking area to pick up an order that the customer placed, for example online. The order may contain a plurality of items, for example, a stuffed bear, beets, and a DVD. The system may then identify the customer's order and associate the order with the customer. A cart, in the designated parking area and containing the associated order, may then be identified by the system using the one or more cameras, for example, based on a unique fiducial or other optically recognizable markings on the cart. The system may also determine the location of the designated cart within the designated parking area. The system may also use the one or more cameras when determining the final location of the customer within the designated area. The cart may then be controlled to move from its determined starting location to the determined final customer location using the one or more cameras. In some embodiments, controlling the cart may include generating a three-dimensional map of the designated area and controlling the cart relative to that map.

Figure 1:
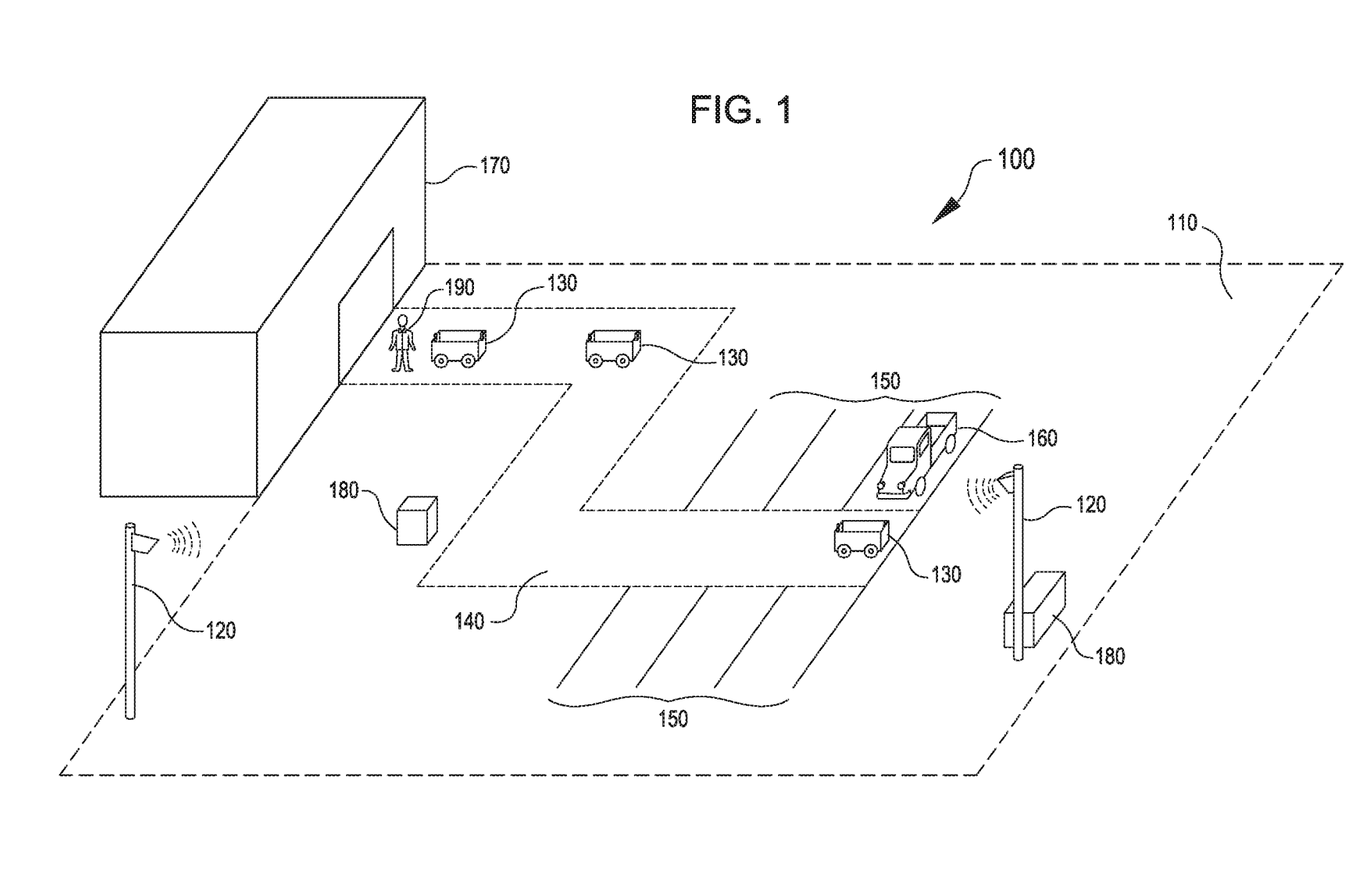
FIG. 1 depicts an illustrative example of a cart delivery system in accordance with embodiments.

Referring now to the drawings, FIG. 1 illustrates an example of a cart delivery system 100. The cart delivery system 100 may include a designated area 110. As non-limiting examples, the designated area 110 may correspond to or include a designated parking lot, a parking garage, a city street, an interior of a store, or a fulfillment center. The designated area may be arranged, for example, in such a way as to allow a user's vehicle 160 to arrive and park while waiting for the user's order to be delivered. The designated area 110 may be designated by a physical barrier, an electronic barrier, or a combination of an electronic and physical barrier. For example, the designated area 110 may be a parking lot surrounded by a geo-fence barrier designated by global positioning system (GPS) coordinates. The designated area 110 may also be surrounded by a light gate or other sensors that send a signal once a user has crossed the specified boundary.

The cart delivery system 100 may include a location system capable of locating objects relative to the designated area 110 and a transportation system capable of moving objects relative to the designated area 110. For example, the cart delivery system 100 may have one or more sensors 120 (hereinafter individually or collectively referenced as the "sensor 120") and one or more transports 130 (hereinafter individually or collectively referenced as the "transport 130"). Although FIG. 1 illustrates two sensors 120 and three transports 130, the cart delivery system 100 may include any other number of sensors 120 and/or transports 130.

In some embodiments, the sensor 120 may be mounted on a stationary support such as a post or pole. Alternatively, the sensor 120 may be mounted on a movable support that is separate from the transport 130. For example, the sensor 120 may be mounted to an unmanned aerial vehicle (UAV) that can navigate the airspace above and around the designated area 110. In some embodiments, the sensor 120 may provide information about location and/or identity of a user vehicle 160. The sensor 120 may provide information that can identify a user vehicle 160 that has entered the designated area 110 and allow tracking of the location of that user vehicle 160 until it has reached a final location within the designated area 110. The sensor 120, for example, may correspond to, form part of, or include cameras, a GPS device, an ALPR system, image processing recognition system, or a Bluetooth receiver for receipt of user submitted information. In some embodiments, the sensor 120 additionally or alternatively may provide information about location and/or identity of the transport 130. The sensor 120 may provide data to the cart delivery system 100 to aid in determining when the transport 130 has been introduced into the designated area 110. The cart delivery system may additionally or alternatively use data, provided by the sensor 120, to determine obstacles that should be avoided by the transport 130 when it is being controlled. The sensor 120, for example, may correspond to or include a tracking system that is partially or completely separate from or outside of the transport 130. Additionally or alternatively, the sensor 120 may further correspond to or include components for facilitating passive or active radio localization, landmark based location, dead reckoning, or ultra-sonic localization.

The transport 130 may correspond to or include a cart, a device, a vehicle, or a carrier capable of transporting one or more items. In some embodiments, the transport 130 may be a wheeled cart, an all-terrain vehicle, a truck, or any other vehicle capable of navigating land. In some embodiments, the transport 130 may capable of navigating air and/or water in addition to or instead of land. For example, the transport 130 may correspond to a UAV, other flying apparatus, boat, or other vehicle. The transport 130 may be suitable for transporting one or more items across a variety of terrains in any manner of environmental conditions. The transport 130 may be controlled in response to data from the sensor 120. For example, the transport 130 many receive navigation data or commands based on information from the sensor 120 to control the movement of the transport 130 around the designated area 110, such as to move the transport 130 to a user vehicle 160 for transfer of items from the transport 130 to the user vehicle 160.

The cart delivery system 100 may further include a transport area 140 and a user area 150. The transport area 140 and the user area 150 may be designated by a visible delineation or an electronic barrier within the designated area 110. For example, the transport area 140 may be designated by painted lines on the ground, an electronic GPS barrier, or other geo-fence. The transport area 140 can also include signs that inform users not to enter the transport area 140. The transport area 140 may also contain physical or electronic barriers that prevent the transport 130 from leaving the transport area 140. The user area 150 may be, for example, designated by painted lines to form parking spots for users. For example, a user may drive their vehicle 160 into the designated area 110 and park in the user area 150 which has been defined by parking lines painted on the ground. The user area 150 can be defined to accommodate any type of user vehicle 160. For example, a user vehicle 160 may be a car, a truck, a drone, or any vehicle suitable for picking up and transporting items. The user area 150 may be surrounded by physical or electronic barriers that prevent the transport 130 from entering the user area 150. Although the transport area 140 and the user area 150 are shown as distinct from one another in FIG. 1, in some embodiments they may overlap, intersect, cross-over one another, or otherwise share at least a portion of the same space.

In various embodiments, the transports 130 may be introduced into the designated area 110 via a fulfillment center 170. The fulfillment center 170 may be a building, a warehouse, or any other structure for holding a plurality of items. In various examples, the fulfillment center 170 may be used as a staging area to place various items into the transport 130 before it is introduced into the designated area 110.

The transport 130 may be introduced to the designated area 110 by an individual or individuals 190 (hereinafter individually or collectively referenced as the "individual 190") The individual 190 may take a transport 130 from inside the fulfillment center 170 and introduce the transport 130 into the designated area 110 where the sensor 120 is able to recognize the transport 130. The individual 190 may introduce the transport 130 into the designated area 110 either by physically moving the transport 130 or communicating with the propulsion system of the transport 130. The individual 190 may be an employee or representative of the service provider discussed later herein. By way of an illustrative example, an employee may push the transport 130 from inside the fulfillment center 170 into the designated area 110 where the sensor 120 then identifies the transport 130. In various embodiments, however, the transport 130 may be introduced to the designated area 110 without an intervening action by the individual 190. Generally, controlling the transport 130 in response to data from the sensor 120 may free up the individual 190 for other tasks and reduce or eliminate an amount of time that the individual 190 might otherwise spend waiting to ensure the transport 130 is ready and available to be pushed to a user vehicle 160 upon arrival to the designated area 110 for pickup.

The sensor 120 may be separate from the transport 130, e.g., mounted to a post or pole located in the designated area 110. The sensor 120 may also be mounted to a movable structure, such that, the sensor 120 can move around the designated area 110 independent from the transport 130. In both instances, the sensor 120 is remote from the transport 130 to facilitate cost savings and ease of use. For example, the sensor 120 may be a single camera (or a predetermined limited number of cameras) remote from the transport 130 and mounted to a pole in the designated area 110. The camera being remote may facilitate cost savings, such as in labor equipment and/or upkeep. For example, retrofitting and/or maintaining the transport 130 with propulsion systems and communication systems may entail less labor and fewer parts than if the transport 130 was equipped with its own camera. Further, savings may be appreciated from avoiding additional chips or computer components to process data from such additional cart-mounted cameras. Moreover, use of a remote camera may allow a less robust (and thus less expensive) camera to be used in comparison to a cart-mounted camera that may be selected to withstand incidental impact from car doors or other objects that may accidentally be brought into contact with the transport 130.

In various embodiments, the sensor 120 and the transport 130 may be in communication with one or more computer systems 180. The computer systems 180 are depicted as being within the designated area 110, however, the computer systems 180 may additionally or alternatively be located at one or more locations outside of the designated area or distributed among locations inside and outside the designated area. The computing functions of the computer systems 180 are shown as taking place in a distinct physical component within the designated area, however, the computing functions performed by the computer systems 180 may additionally or alternatively be performed via cloud computing or alternative components. For example, some or all elements of the computer system 180 may be incorporated into the sensor 120 rather than being fully discrete components separate from the sensor 120.

Figure 2:
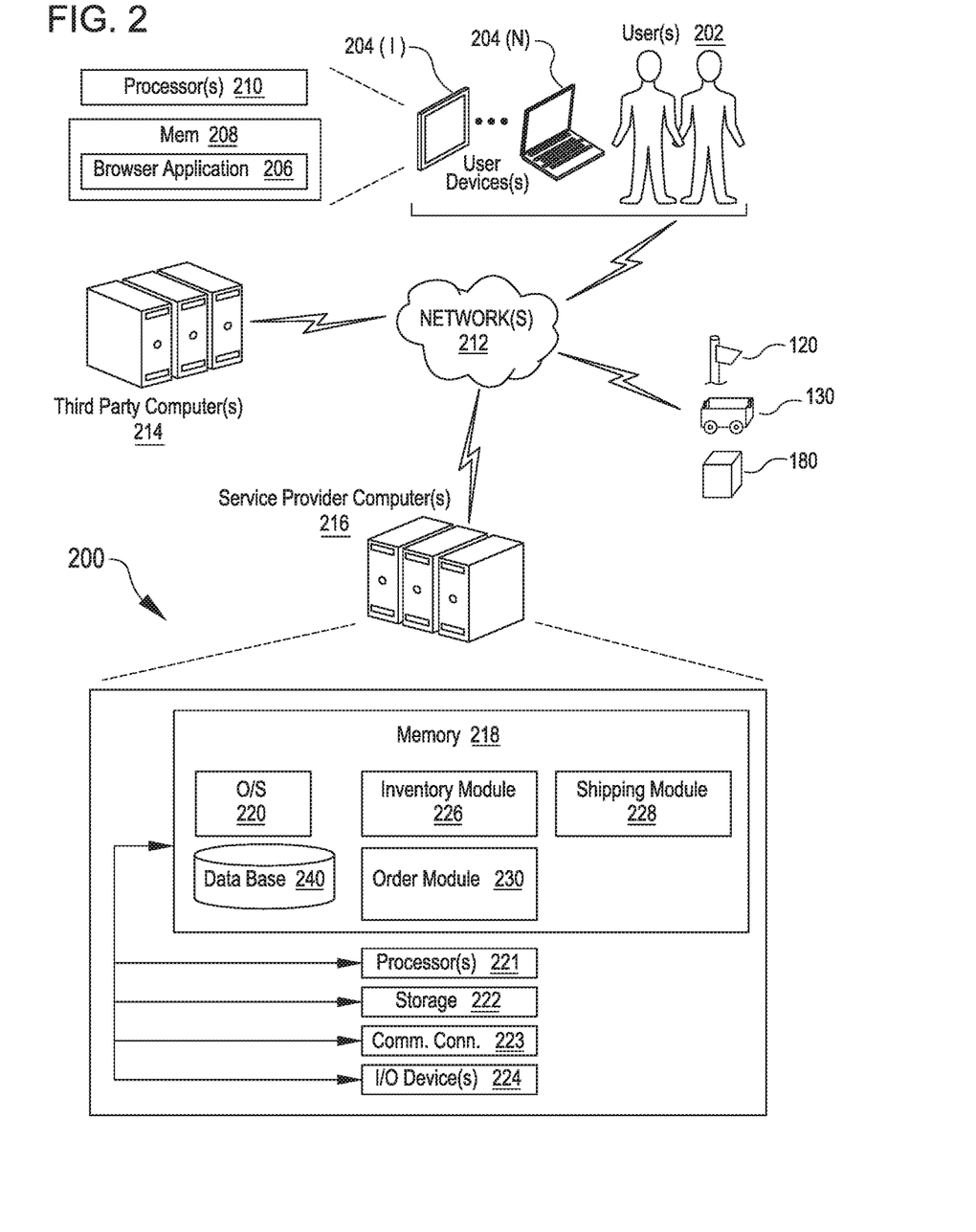
FIG. 2 is a schematic diagram depicting an illustrative system or architecture in which techniques related to the cart delivery system of FIG. 1 may be implemented in accordance with embodiments.

FIG. 2 depicts an illustrative system or architecture 200 in which techniques related to the one or more computer systems 180 of the cart delivery system 100 of FIG. 1 may be implemented. In architecture 200, one or more users 202 may utilize user computing devices 204(1)-(N) (collectively, user devices 204) to access a browser application 206 (e.g., a web browser) or a user interface (UI) accessible through the browser application 206, via one or more networks 212. The "browser application" 206 can be any browser control or native application that can access and display a network page or other information. In some aspects, the browser application 206 may be hosted, managed, and/or provided by a computing resources service or service provider, such as by utilizing one or more service provider computers 216. The one or more service provider computers 216 may, in some examples, provide computing resources such as, but not limited to, client entities, low latency data storage, durable data storage, data access, management, virtualization, hosted-computing-system-based software solutions, electronic content performance management, etc. The one or more service provider computers 216 may also be operable to provide web or network hosting, computer application development, and/or implementation platforms, combinations of the foregoing, or the like to the one or more users 202.

In one illustrative configuration, the user devices 204 may include at least one memory 208 and one or more processing units or processor(s) 210. The processor(s) 210 may be implemented as appropriate in hardware, computer-executable instructions, firmware, or combinations thereof. Computer-executable instruction or firmware implementations of the processor(s) 210 may include computer-executable or machine-executable instructions written in any suitable programming language to perform the various functions described. The user devices 204 may also include geo-location devices (e.g., GPS device or the like) for providing and/or recording geographic location information associated with the user devices 204.

The memory 208 may store program instructions that are loadable and executable on the processor(s) 210, as well as data generated during the execution of these programs. Depending on the configuration and type of user device 204, the memory 208 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 208 may include multiple different types of memory, such as static random access memory (SRAM), dynamic random access memory (DRAM), or ROM.

Turning to the components of the memory 208 in more detail, the memory 208 may include an operating system and one or more application programs or services for implementing the features disclosed herein via the browser application 206 or dedicated applications (e.g., smart phone applications, tablet applications, etc.). The browser application 206 may be configured to receive, store, and/or display a website, a link to an electronic marketplace, or other interface for interacting with the one or more service provider computers 216. Additionally, the memory 208 may store access credentials and/or other user information such as, but not limited to, user IDs, passwords, and/or other user information. In some examples, the user information may include information for authenticating an account such as, but not limited to, a device ID, a cookie, an IP address, a location, or the like. In addition, the user information may include a user 202 provided response to a security question or a geographic location obtained by the user device 204.

In some examples, the networks 212 may include any one or a combination of many different types of networks, such as cable networks, the Internet, wireless networks, cellular networks and other private and/or public networks. While the illustrated example represents the users 202 accessing the browser application 206 over the networks 212, the described techniques may equally apply in instances where the users 202 interact with the one or more service provider computers 216 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the browser application 206 may allow the users 202 to interact with the one or more service provider computers 216, such as to access content like webpages or network pages. The one or more service provider computers 216, perhaps arranged in a cluster of servers or as a server farm, may host the browser application 206 and/or cloud-based software services. Other server architectures may also be used to host the browser application 206 and/or cloud-based software services. The browser application 206 may be capable of handling requests from many users 202 and serving, in response, various user interfaces that can be rendered at the user devices 204 such as, but not limited to, a webpage, a website, network site, or network page. The browser application 206 can interact with any type of website or network site that supports user interaction, including social networking sites, electronic retailers, informational sites, blog sites, search engine sites, news and entertainment sites, and so forth. The described techniques can similarly be implemented outside of the browser application 206, such as with other applications running on the user device 204.

The one or more service provider computers 216 may be any type of computing device such as, but not limited to, a mobile phone, a smart phone, a personal digital assistant (PDA), a laptop computer, a desktop computer, a server computer, electronic book (e-book) reader, a thin-client device, a tablet PC, etc. Additionally, it should be noted that in some embodiments, the one or more service provider computers 216 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment. In some examples, the one or more service provider computers 216 may be in communication with the user device 204 via the networks 212, or via other network connections. The one or more service provider computers 216 may include one or more servers, perhaps arranged in a cluster or as individual servers not associated with one another. The one or more service provider computers 216 may be in communication with one or more third party computers 214, one or more sensors 120, one or more transports 130, or one or more computer systems 180 via networks 212. The one or more service provider computers 216 that host the browser application 206 may obtain and provide data to third party computers 214, one or more sensors 120, one or more transports 130, or one or more computer systems 180 via networks 212 in accordance with embodiments described herein. Additionally, the one or more computer systems 180 may also correspond to, at least partially include, or be at least partially included within the one or more third party computers 214 and/or the one or more service provider computers 216.

In one illustrative configuration, the one or more service provider computers 216 may include at least one memory 218 and one or more processing units or processors(s) 221. The processor(s) 221 may be implemented as appropriate in hardware, computer-executable instructions, firmware, or combinations thereof. Computer-executable instruction or firmware implementations of the processor(s) 221 may include computer-executable or machine-executable instructions written in any suitable programming language to perform the various functions described. The memory 218 may store program instructions that are loadable and executable on the processor(s) 221, as well as data generated during the execution of these programs. Depending on the configuration and type of the one or more service provider computers 216, the memory 218 may be volatile (such as RAM) and/or non-volatile (such as ROM, flash memory, etc.). The one or more service provider computers 216 or servers may also include additional storage 222, which may include removable storage and/or non-removable storage. The additional storage 222 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 218 may include multiple different types of memory, such as SRAM, DRAM, or ROM.

The memory 218, the additional storage 222, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 222 are all examples of computer storage media. Additional types of computer storage media that may be present in the one or more service provider computers 216 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium, which can be used to store the desired information and which can be accessed by the one or more service provider computers 216. Combinations of any of the above should also be included within the scope of computer-readable media.

The one or more service provider computers 216 may also contain communication connection(s) 223 that allow the one or more service provider computers 216 to communicate with a stored database, another computing device or server, user terminals and/or other devices on the networks 212. The one or more service provider computers 216 may also include I/O device(s) 224, such as a keyboard, a mouse, a pen, a voice input device, a touch input device, a display, speakers, a printer, etc.

Turning to the contents of the memory 218 in more detail, the memory 218 may include an operating system 220, one or more data stores 240 and/or one or more application programs, services, or other software modules, which are generally executed by a processor (e.g., the processors 210 and/or 221) for implementing the features disclosed herein.

Example modules are shown in FIG. 2, but functions and embodiments described herein can utilize a subset of the features provided by the modules and/or additional functions can be provided. Additionally, while the example modules will now be briefly discussed with regard to FIG. 2, further specific details regarding the example modules are provided below in the descriptions of subsequent Figures.

As an example module of memory 218, a user identification module 226 can be provided for receiving, sending, updating, and/or otherwise processing information about the users 202, including but not limited to, obtaining an order from a user for items for pickup and/or determining an identity and/or location of a vehicle 160 of a user 202 relative to the designated area 110. A transport identification module 228 can be provided for handling details associated with associating a transport 130 with an order from users 202 and/or locating the transport 130 relative to the designated area 110. A control module 230 can be provided for handling information and/or instructions associated with delivering items from the fulfillment center 170 to users 202 via the transports 130.

Figure 3:
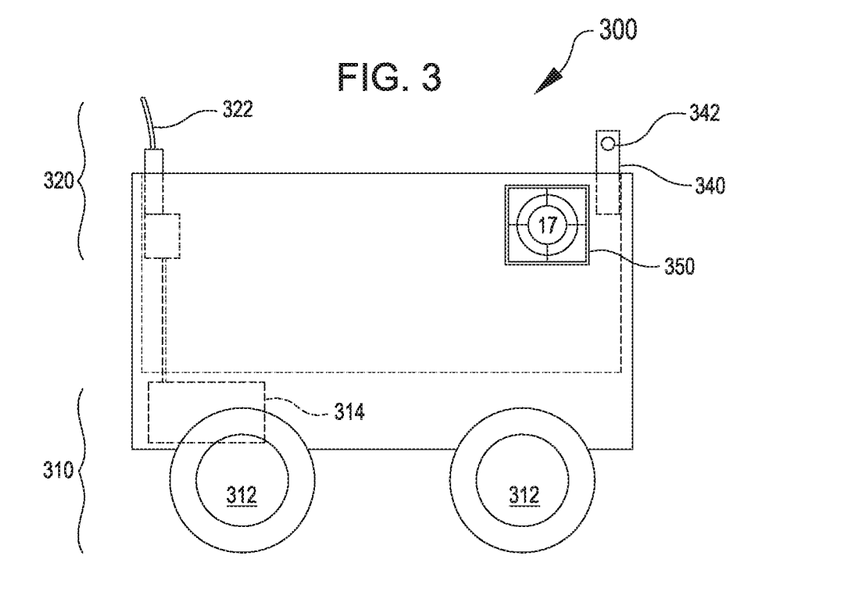
FIG. 3 illustrates an example of a cart of the cart delivery system of FIGS. 1 and 2 in accordance with embodiments.

FIG. 3 shows an example of a transport 300. The transport 300 may be an example of the transport 130 described elsewhere herein. The transport 300 of FIG. 3 may contain additional or alternative elements from the transport 130 shown in FIG. 1. The transport 300 may be used to take items from the fulfillment center 170 to the user vehicle 160. By way of example, transport 300 depicted in FIG. 3 includes a propulsion system 310 and a communication unit 320.

The propulsion system 310 may be used to move transport 300 around the designated area 110, for example, from the fulfillment center 170 to the user vehicle 160. The propulsion system 310, as depicted, includes wheels 312 and a motor 314 to move the transport 300, however, the propulsion system 310 could also include any elements capable of moving the transport 300. For example, the propulsion system 310 may include propellers, tracks, treads, a jet engine, skis, a fan, or any additional or alternative components that may allow the propulsion system to travel across any matter of terrain.

The communication unit 320 may enable communication with the computer systems 180, for example, to receive information and/or commands for navigating the transport 300 to the location of vehicle 160 of the users 202. The communication unit 320 can provide suitable commands to the propulsion system 310 to move the transport 300 accordingly. In some embodiments, the communication unit 320 may facilitate remote control of the transport 300 based on input from the sensor 120 that is remote from the transport 300 and/or responsive to data processed remote from the transport 300. Remote location of the relevant sensor 120 and/or data processing devices (such as computer systems 180) may reduce a complexity and/or cost of transport 300 and/or facilitate many-to-one or many-to-few relationships between the transport 300 and other components of the cart delivery system 100 (such as the sensor 120 and/or computer systems 180) in a manner that may reduce costs by reducing a number of comparatively more expensive components than if each transport 300 instead included its own on-board respective sensor 120 and/or data processing devices (such as computer systems 180). The communication unit 320 may include an antenna 322 to facilitate an appropriate range at which it can communicate with the computer systems 180, for example, which may allow the communication unit 320 to send and receive data outside of the designated area 110.

The transport 300 may include a basket 330. The basket 330 may contain a plurality of items ordered by users 202. The basket 330 may be filled with items at the fulfillment center 170 or any other suitable location.

The transport 300 may also include an indicator 340. The indicator 340 may, for example, alert users 202 when the basket 330 has been filled with items or has been emptied of items. The indicator 340 may also provide data received by the communication unit 320 such as the coordinates of the final destination of the transport 130 or a list of what items have been placed in the basket 330. The indicator 340 may include at least one light emitting diode (LED 342, that may be a single color, multiple colors, or have the ability to change colors. The colors, for example, may change in response to a changed condition of the transport 300. In some embodiments, a color or other indicia provided by the indicator 340 may be part of a color-coding scheme to assist users 190 to identify which transports are carrying items for which order. For example, a first user device 204 may show a green color to cue a first user 190 to watch for transports displaying green lights, while a second user device 204 may show a purple color so a second user 190 knows to focus on transports emitting purple lights. The user 190, user device 204, or other individual may interact with the indicator 340. For example, the user 190 may use the indicator to enter a code.

The transport 300 may also include a fiducial 350. The fiducial 350 may be a design, containing data, and recognizable by the one or more sensors 120. For example, the fiducial 350 may contain data such as a cart number or information indicative of a cart destination. As an illustrative example, the fiducial may correspond to an optically recognizable pattern that can be automatically identified within an image to determine a cart destination relative to other landmarks of the designated area 110 represented within the image. The fiducial 350 may also contain data that allows for calibration of the sensor 120. As an illustrative example, a fiducial 350 may be affixed to a transport 130 and controlled to move around the designated area 110 in a predetermined manner to provide a basis from which to calibrate the sensor 120.

Figure 4:
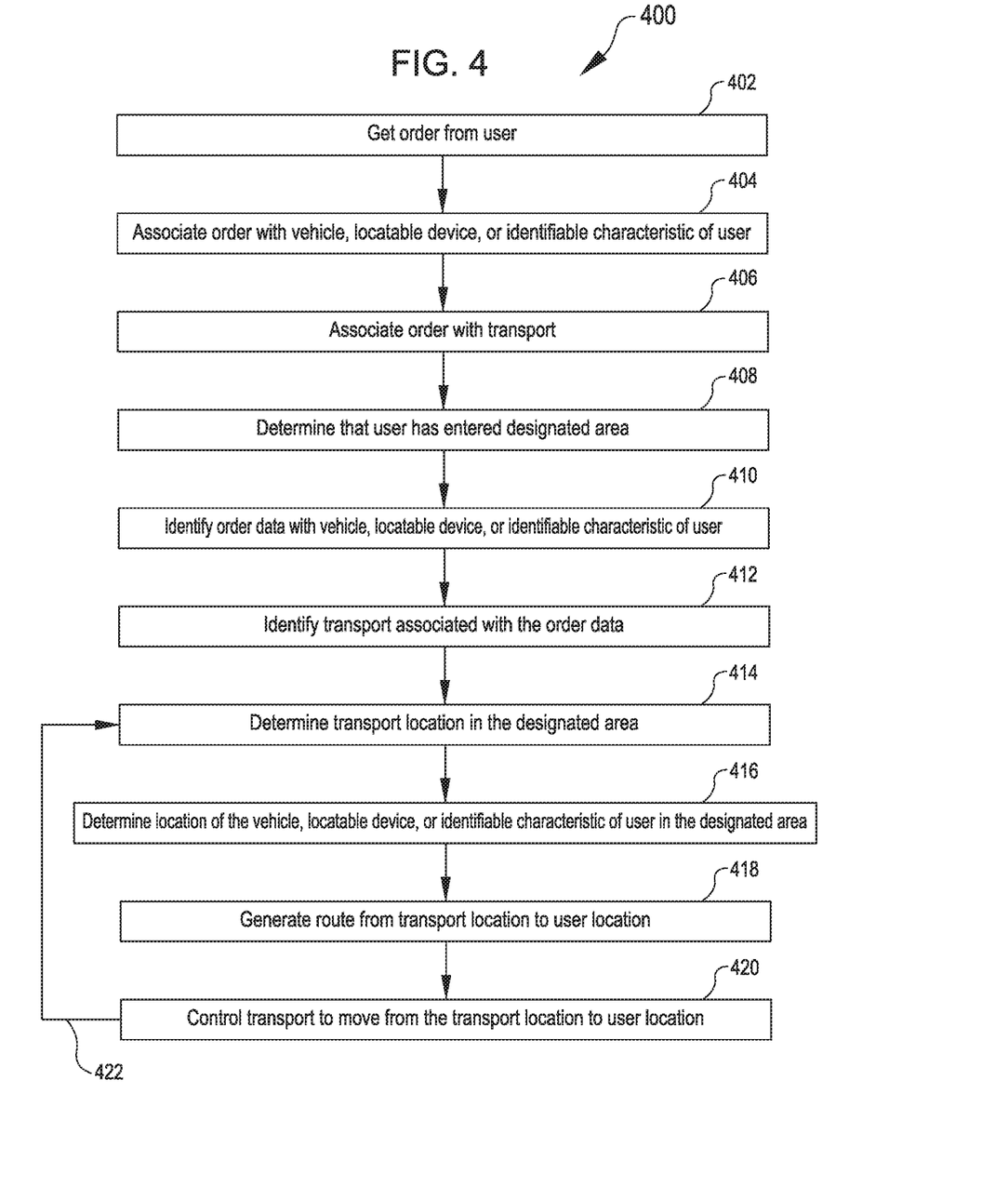
FIG. 4 is a flowchart illustrating a process of controlling a transport to an identified user's location such as by use of the cart delivery system of FIGS. 1-3 in accordance with embodiments.

FIG. 4 is a flow chart representing an example of a process 400 for using data from the sensor 120 to control the transport 130 from a fulfillment center 170 to a user vehicle 160 in a designated area 110 of FIG. 1 in accordance with some embodiments. Some or all of the process 400 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Moreover, unless indicated otherwise, acts shown in the processes are not necessary performed in the order shown, and/or some acts can be omitted in embodiments.

The process 400 at 402 can include receiving an order from a user 202. The user 202 may place their order using the user devices 204. The order may include particular items to be provided from the fulfillment center 170 for pickup by the vehicle 160 of the user 202, for example. The order may be received by the service provider computers 216, for example, by the user identification module 226.

The process 400 at 404 can include associating the order with a vehicle 160, locatable device of a user 202, or other identifiable characteristic of the user 202. For example, the user identification module 226 of the service provider computers 216 may be configured to associate the order received from a user 202 with a vehicle 160, locatable device of a user 202, or identifiable characteristic of the user 202. The identifiable characteristic of the user 202 may, for example, be the user's face. The locatable device of the user 202 may, for example, be the user devices 204. The order may be associated with a vehicle 160 by associating with a license plate, make, model, or other attribute of the vehicle, for example.

The process 400 at 406 can include associating the order with a transport 130. For example, the order can be associated with a transport 130 that has been loaded with items requested in the order. The transport identification module 228 of the service provider computers 216 may be configured to associate the order from the user 202 with a transport 130.

The process 400 at 408 can include determining a user 202 has entered a designated area 110. For example, the user identification module 226 of the service provider computers 216 may be configured to receive data from the sensor 120 (e.g., which may correspond to multiple sensor 120 disposed throughout the designated area 110). The designated area 110 may be, for example, a parking lot or parking structure surrounded by a geo-fence. Thus, for example, the process at 408 may correspond to a license plate of a vehicle 160 identified at 404 being detected within the designated area 110 by the sensor 120.

The user identification module 226 may further be configured to determine an estimated time at which the user 202 may arrive at the designated area 110 based, at least partially on, data received from the user 202. For example, the user identification module 226 may receive GPS coordinates of the vehicle 160 or other locatable device of the user 202 outside the designated area 110. The user identification module 226 may also receive an alert or signal that the user 202 has passed by a predetermined border or landmark. The user identification module 226 may also receive a notification from the user 202, for example, a time at which the user 202 plans to pick up their order. The estimated time of arrival may be utilized to trigger the transport 130 identified at 406 to be loaded with items for the order, for example.

The process 400 at 410 can include identifying order data associated with the vehicle 160, locatable device of the user 202, or identifiable characteristic of the user 202. The user identification module 226 may be configured to identify the order data that has been previously associated (such as at 404) with the vehicle 160, locatable device of the user 202, or identifiable characteristic of the user.

The process 400 at 412 can include identifying a transport 130 associated with the order data. For example, the transport identification module 228 of the service provider computers 216 may be configured to identify the transport 130 based on the order data identified at 410 and the association of the order with the transport 130 at 404.

The process 400 at 414 can include determining the location of the identified transport 130 in the designated area 110. For example, the control module 230 may receive data from the sensor 120 relating to the location of the transport 130 within the designated area 110. The sensor 120 may correspond to, include, or be included in a tracking system. The tracking system may be partially or completely separate from or outside of the transport 130. For example, the tracking system or the sensor 120 may utilize some or all of the components necessary to: receive a passive radio localization signal, receive an active radio localization signal, receive the location of a landmark based on at least data received by the sensor 120, receive a signal using dead reckoning, or receiving a location using ultra-sonic localization. Additionally or alternatively, the tracking system or the sensor 120 may utilize some or all of the components necessary to: determine a GPS location of the transport location based at least on a GPS signal received from the transport 130 or from the sensor 120, receive location information submitted by a user 202, or identify the transport using image processing recognition.

In some embodiments, the sensor 120 may determine a GPS location of the transport 130 by measuring a location of the transport 130 relative to the location of the sensor 120. For example, the relative position of the transport 130 and a GPS location of the sensor 120 may be used to determine a GPS location of the transport 130. Additionally or alternatively, several sensors 120 may measure a location of the transport 130, and the measurements may be combined to determine a location of the transport 130 relative to one or more sets of GPS coordinates of the several sensors 120 or other known reference points.

The process 400 at 416 can include determining the location of the vehicle locatable device of the user 202, or identifiable characteristic of the user 202 in the designated area 110. For example, the control module 230 of the service provider computers 216 may be configured to receive data from the sensor 120 to identify where the user has stopped within the designated area 110. In some embodiments, this includes using information from the sensor 120 to track the vehicle 160, locatable device, or identifiable characteristic of the user 202 after it has entered the designated area 110 and until it has reached the user area 150.

The location of the user 202 may be determined using any or all of the following methods by themselves or in combination. For example, the user location may be determined by: determining a GPS location of a user's device based at least on a GPS signal received from the user's device, using an ALPR to identify a user's vehicle, receiving user submitted location information, or identifying a user using image processing recognition. Additionally or alternatively the location of the user 202 may be determined by: receiving a passive radio localization signal from the user device 204 or the user's vehicle 160, receiving an active radio localization signal from the user device 204 or the user's vehicle 160, receiving the location of a landmark based on at least data received by the sensor 120, receiving a signal using dead reckoning, or receiving a location using ultra-sonic localization.

The process 400 at 418 can include generating a route from the transport location to the user location. For example, the control module 230 of the service provider computers 216 may be configured to receive the location of the transport 130 (e.g., determined at 414) and the location of the vehicle 160, locatable device, or identifiable characteristic of the user 202 (e.g., determined at 416). The control module 230 may define a route for the transport 130 to follow from the transport location to the user location. In various embodiments, this route may prioritize staying in a transport area 140 and avoid entering the user area 150 until the transport 130 has reached the user location. This route may involve calculating a plurality of routes and choosing a route based on data received from the sensor 120. This route may also be in three-dimensions, e.g., taking into account a change in elevation of the designated area 110. The route may also be in two dimensions (i.e., a plane). The two dimensional route may be coplanar with—or parallel to—the designated area 110 in which the transport 130 moves.

Reference objects may be located in the designated area 110 and used for calibration of the sensor 120 or to aid with route generation. For example, reference objects may be added to the designated area 110 and/or removed after one or multiple calibrations or route generations. Additionally or alternatively, the reference objects may be permanently placed in the designated area 110 for use with multiple calibrations or route generations. Reference objects may include a fiducial placed within the designated area 110 that can be moved around the designated area 110 or maintained in place. Objects located in the designated area 110 to serve a purpose other than calibration or route generation may be used for calibration or route generation. For example, a pole or post within the designated area 100 that is used for supporting electronic components may be used for calibration or route generation. Additionally or alternatively, a license plate of a vehicle 160 may be used for calibration or route generation. For example, a reference height of a license plate may be compared with a license plate height measured by the sensor 120 and used to aid calibration of the sensor 120.

The process 400 at 420 can include controlling the transport 130 from the transport location to the user location. This may include the control module 230 using the sensor 120 to control the transport 130 along the route that has been defined between the location of the transport 130 and the user location. In various embodiments, the control module 230 may send data to the communication unit 320 of the transport 130 in order to control the propulsion system 310. The control module 230 may control multiple transports 130 at a time along a single path or along multiple paths created by the control module 230. For example, the control module 230 may control a first transport 130 to move to the user location and also control a second transport 130 to move to the user location, for example, after the first transport 130 has reached the user location.

The process 400 at 414 to 420 can be repeatable to update the position of the transport 130 and the user 202. For example, as the transport 130 moves around the designated area 110, the transport location can change. The process 400 may use the transport's 130 new location to generate a new route from the transport location to the user location. Additionally or alternatively, the user 202 may move around the designated area 110, changing the user location. The process 400 may update the user location and generate a new route from the transport location to the user location. The process 400 may also continuously receive new locations for both the transport 130 and user 202 which may cause a new route from the transport location to the user location to be continuously generated. More generally, the part or all of the actions identified at 414-420 in FIG. 4 may be performed iteratively, e.g., as illustrated by arrow 422.

The control module 230 may also control the transport 130 to a subsequent location in the designated area 110 after the transport 130 has reached the user location. For example, the control module 230 may control the transport 130 to move from the user location back to the original transport location. The control module 230 may also control the transport 130 to move to a third location that is distinct from the user location and the transport location. The control module 230 may also control multiple transports 130 to move among multiple locations, for example, controlling a first transport 130 back to the original transport location and controlling a second transport 130 to a separate location.

Figure 5:
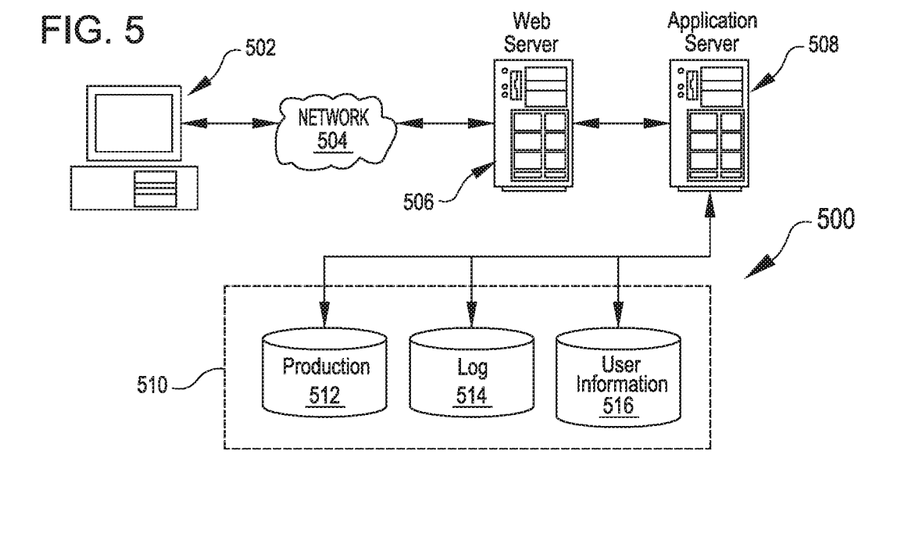
FIG. 5 illustrates an environment in which various embodiments can be implemented.

FIG. 5 illustrates aspects of an example environment 500 for implementing aspects in accordance with various embodiments. As will be appreciated, although a Web-based environment is used for purposes of explanation, different environments may be used, as appropriate, to implement various embodiments. The environment includes an electronic client device 502, which can include any appropriate device operable to send and receive requests, messages, or information over an appropriate network 504 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 506 for receiving requests and serving content in response thereto, although for other networks an alternative device serving a similar purpose could be used as would be apparent to one of ordinary skill in the art.

The illustrative environment includes at least one application server 508 and a data store 510. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 502 and the application server 508, can be handled by the Web server. It should be understood that the Web and application servers are not required and are merely example components, as structured code discussed herein can be executed on any appropriate device or host machine as discussed elsewhere herein.

The data store 510 can include several separate data tables, databases or other data storage mechanisms and media for storing data relating to a particular aspect. For example, the data store illustrated includes mechanisms for storing production data 512 and user information 516, which can be used to serve content for the production side. The data store also is shown to include a mechanism for storing log data 514, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 510. The data store 510 is operable, through logic associated therewith, to receive instructions from the application server 508 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 502. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 5. Thus, the depiction of the system 500 in FIG. 5 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
    a plurality of cameras dispersed in or around a first area so as to provide image data about objects relative to the first area;
    a plurality of carts each receivable into the first area and each comprising:
        a basket configured to receive a plurality of items;
        a plurality of wheels connected with the basket;
        a propulsion system to drive the wheels; and
        a communication unit coupled with the propulsion system; and
    a computer system comprising one or more processors, memory, and computer-executable instructions stored in the memory and executable by the one or more processors to cause the computer system to at least:
        determine that a customer has entered the first area;
        identify order data associated with the customer;
        identify, from among the plurality of carts, a corresponding cart associated with the order data and containing one or more items ordered by the customer;
        determine, for the corresponding cart, a cart location within the first area by analyzing the image data provided by the plurality of cameras;
        determine, for the customer, a customer location within the first area by analyzing the image data provided by the plurality of cameras;
        generate a route from the cart location to the customer location within the first area by analyzing the image data provided by the plurality of cameras; and
        send communication instructions to the propulsion system of the cart via the communication unit to move the cart from the cart location to the customer location according to the route generated.

2. The system of claim 1, wherein the instructions cause the computer system further to determine an estimated arrival time of the customer to the first area by receiving:
    a customer's global positioning system (GPS) coordinates;
    an alert that the customer has passed a predetermined border; or
    a notification from the customer.

3. The system of claim 2, wherein the instructions cause the computer system to generate, based at least in part on the estimated arrival time determined, instructions to put items into the cart basket or introduce the cart into the first area.

4. The system of claim 1, wherein the instructions further cause the computer system to:
    identify when the cart reaches the customer location; and
    control the propulsion system of the cart via the communication unit of the cart to move the cart from the customer location to a subsequent location based at least in part on the image data provided by the plurality of cameras.

5. The system of claim 1, wherein the cart further comprises a fiducial recognizable based at least in part on the image data provided by the plurality of cameras and configured to identify the cart and cart location in the first area.

6. The system of claim 1, wherein the cart further includes an indicator configured to identify when the basket contains the plurality of items and when the basket no longer contains the plurality of items.

7. A system, comprising:
    a camera having a field of view that includes a designated area;
    a first transport comprising a first propulsion system and a first communication unit;
    a second transport comprising a second propulsion system and a second communication unit;
    a processor; and
    a memory including instructions that, when executed by the processor, cause the system to at least:
        identify a first user location of a first user in the designated area and a second user location of a second user in the designated area, the first user location and the second user location based on information from a sensor or other input about user positioning;
        determine a first transport position of the first transport based at least in part on data from the camera;
        determine a second transport position of the second transport based at least in part on data from the camera;
        control the first propulsion system via the first communication unit to cause the first transport to move from the first transport position to the first user location within the designated area; and
        control the second propulsion system via the second communication unit to cause the second transport to move from the second transport position to the second user location within the designated area.

8. The system of claim 7, wherein the instructions further cause the first transport to move from the first user location to the second user location or cause the second transport to move from the second user location to the first user location.

9. The system of claim 7, wherein the second transport moves from the second transport position to the second user location after the first transport has been controlled from the first user location to a subsequent location within the designated area.

10. The system of claim 7, wherein the camera comprises a plurality of cameras dispersed in or around the designated area.

11. The system of claim 7, wherein the instructions further cause the system to:
    create a map of the designated area based at least in part data provided by the camera; and
    control the first propulsion system via the first communication unit or control the second propulsion system via the second communication unit based at least in part on the map.

12. The system of claim 7, wherein the sensor comprises the camera and wherein the first user location and the second user location are each identified based at least in part on data from the camera.

* * * * *